UNITED STATES PATENT OFFICE.

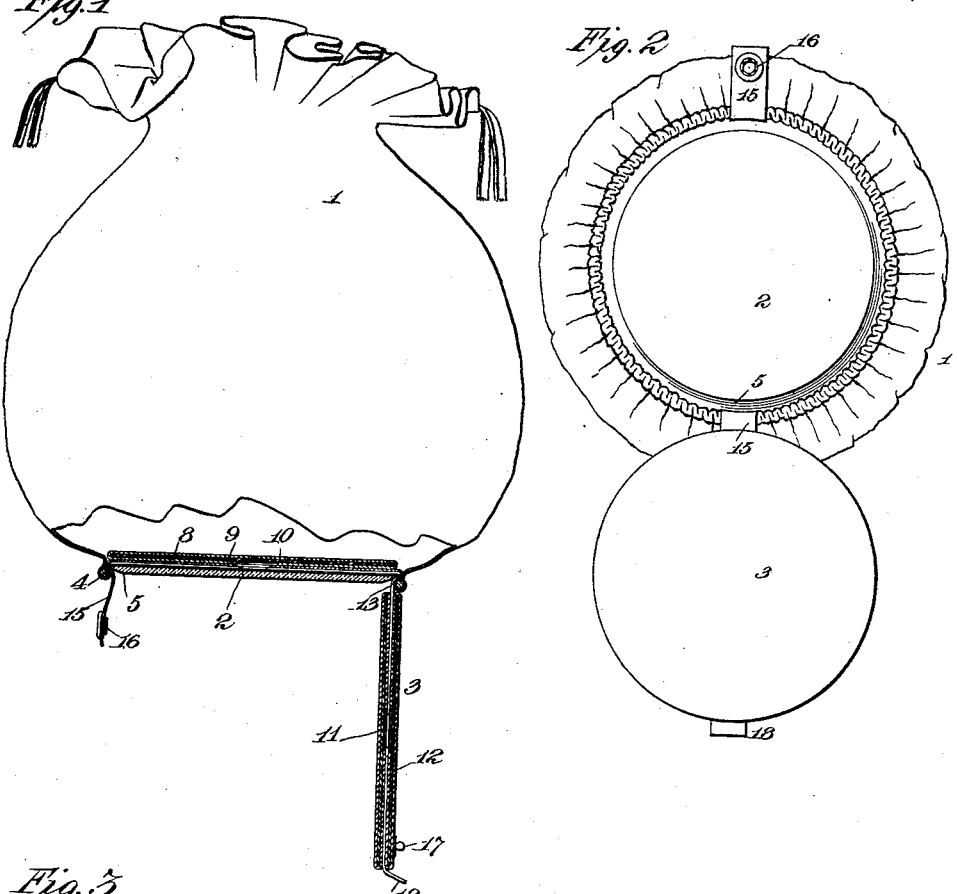

CONSTANCE T. SLADE, OF NEW YORK, N. Y.

HAND-BAG.

No. 910,875.

Specification of Letters Patent.

Patented Jan. 26, 1909.

Application filed May 2, 1908. Serial No. 430,438.

*To all whom it may concern:*

Be it known that I, CONSTANCE T. SLADE, a citizen of the United States, and a resident of the borough of Manhattan, city, county, and State of New York, have invented a new and useful Hand-Bag, of which the following is a specification.

The object I have in view is the production of a bag which will carry a mirror in such a position that it can be conveniently used, and at the same time will be protected from injury and may be hidden from sight.

A further object is to produce a bag in which the parts will be strongly secured together, in which wear between relatively moving surfaces will be reduced, and which will be light and of pleasing appearance.

These and further objects will more fully appear from the following specification and accompanying drawings, considered together or separately.

Figure 1 is a view of a bag embodying my invention, shown partly in section. Fig. 2 is a bottom view of the same, showing the mirror exposed. Fig. 3 is a view of the bottom of the bag in section and on an enlarged scale. Fig. 4 is a view partly in section and partly perspective, showing the bottom of a bag with the parts in an incompleted state. Fig. 5 is a similar view showing the parts one stage nearer completion. Fig. 6 is a sectional view of the bottom of a bag showing a modified embodiment of the invention, the mirror being exposed. Fig. 7 is a similar view, with the parts in closed position, said view being taken at right angles to Fig. 6; and Fig. 8 is a view partly in section and partly perspective of the bottom of a bag, made in accordance with this modification, in a partly completed condition.

In all of the views like parts are designated by the same reference characters.

In carrying out my invention I provide a bag 1, of fabric, either textile or non-textile. The said bag is preferably open at the top and is closable in any manner, as by a draw-string, as shown. In the bottom of the bag is a mirror 2. This mirror may be immovably or movably attached to the bag, as shown in the structure illustrated in Figs. 1 to 5 inclusive, or may be movably attached to a cover 3, shown in the structure illustrated in Figs. 6 to 8 inclusive. I will first proceed to describe the first embodiment of the invention.

The mirror 2 is preferably though not necessarily round, as shown, and is secured to the bag by a device, which includes a ring 4, which is substantially the same shape as the mirror. Any shape of mirror may be employed as is obvious. This ring is endless, and so arranged that it incloses a space of the same shape as the mirror, although smaller in all directions than the latter, and of an internal diameter less than the greatest diameter of the mirror. The mirror may be provided with a bevel 5, producing thereby an edge which is of less thickness than the maximum thickness of the mirror. The ring 4 may be made of celluloid or other suitable material.

The bag is preferably made in the form of a cylinder with an open bottom, and the ring 4 is preferably sewed on the inside of the cylinder, at some distance from the lower edge thereof. The ring will be held in position by the stitching 6 (see Fig. 4). A draw-string 7 is then threaded through openings formed in the portion of the bag which extends beyond the ring. The mirror is then placed in the position shown in Fig. 4, and the draw-string tightened and its ends tied, drawing the fabric of which the bag is made tightly and closely over the back of the mirror, as shown in Fig. 5. The portion of the bag which extends beyond the ring may be sufficiently long, so that when the draw-string is drawn, the entire top of the mirror will be covered, and the bottom of the bag will be closed by the fabric. The attachment of the mirror to the bag by means of the ring 4, and the use of the draw-string 7, produces an arrangement by means of which the ring may be tightly drawn against the edge of the mirror, and the fabric of which the bag is made may be tightly drawn against the back of the mirror, thus holding the parts firmly in position, and increasing the strength of the structure, and preventing the accidental displacement of the bottom of the bag by the weight of objects carried within the bag. By imparting sufficient tension to the draw-string, the mirror can be tightly clamped against the ring, and the ring can be tightly drawn against the mirror, giving the bag a rigid bottom. The mirror will be held in position sufficiently strong so that it cannot possibly drop out. If desired, suitable adhesive material can be applied to the top of the mirror and the bottom of the bag to secure the two together, but this is not essential.

For the purpose of protecting the back of the mirror, a false bottom 8 may be introduced within the bag, such false bottom being of the same shape as the mirror, and preferably of the same diameter. This false bottom may be made of a disk of cardboard 9, covered with a fabric 10, which will be drawn smoothly over the top of the disk, and secured to the bottom with a draw-string, similar to the draw-string 7, or by an adhesive. This false bottom may be secured to the bottom of the bag by adhesive material, if such is desired.

For the purpose of protecting the face of the mirror, a cover 3 is used. This cover preferably comprises an inner disk 11 of cardboard or similar material, covered with fabric in the same manner as the false bottom already described, and an outer disk 12, similarly made. These two disks may be secured together by stitching or by adhesive material. The inside of the cover being lined with fabric will lie against the face of the mirror and will keep it from being scratched. For the purpose of securing the cover to the bag, a strip of fabric, forming a hinge 13, is employed, this hinge being secured to the cover between the two disks and to the bag 1 in the manner illustrated in Fig. 4. The hinge enters the space between the mirror and the ring, and is secured by stitching 14 to that portion of the bag which lies over the top of the mirror. For the purpose of securing the cover in closed position and in contact with the mirror, a catch or latch 15, formed of a strip of fabric and attached to the bag in the same manner as the hinge 13, is employed. The end of this catch 15 is provided with a glove fastener, or similar device, the other member 17 being secured to the cover. A strip of fabric 18 provides a handle by means of which the cover may be opened. The diameter of the cover should be such that it will snugly lie within the ring 4. The edges of the cover being formed of fabric will engage with the fabric, of which the bag is made, and which covers the ring 4, consequently the two engaging surfaces will be of fabric, and there will be less wear than if one of the portions was formed of a hard material, such as metal or celluloid, engaging with fabric. The parts may also be made easier and will make a tighter fit by being made of the fabric than if they were both made of a hard material, such as metal or celluloid. The absence of all metal parts in contact with the mirror will prevent scratching of the latter, and the arrangement of the fabric edge of the cover engaging with the inside of the ring produces wearing surfaces of fabric against fabric, which will wear much longer without changing its appearance, than would fabric against metal, or metal against fabric. The false bottom and cover, being made of disks of cardboard covered with fabric, are light in weight and cheap to construct, and yet adequately protect the mirror from injury.

In the modification shown in Figs. 6 to 8, the mirror is carried by the cover 3 instead of directly upon the bottom of the bag. The bottom of the bag comprises an outer disk 19 (see Fig. 8) formed of cardboard or other material covered with fabric 20. This fabric is drawn over the top of the disk, and is provided with a draw-string 21, by means of which it may be tightly stretched over the fabric and firmly held in position. The sides of the bag are brought down over the overlapped portion of the fabric and are secured thereto by stitching 22. The hinge 13$^a$ and latch or catch 15$^a$ are interposed between the two fabrics, as shown, and are secured to both of them by the stitching 23. In addition to the stitching an adhesive material may be employed. A false bottom 24 (Figs. 6 and 7) lies within the bottom of the bag, and may be secured thereto by adhesive material. The false bottom 24 may be identical with the false bottom 8, as already described in connection with the first modification. The cover is made somewhat in the same manner as the bottom of the first modification. The mirror 2$^a$ is secured in place by means of a ring 4$^a$, the said ring being proportioned to the mirror in the same manner as the ring 4 is proportioned to the mirror 2 in connection with the first modification. The fabric 25 is looped over the ring 4$^a$, and its ends are secured together and drawn tightly inward across the back of the mirror by a draw-string (not shown) but arranged in the same manner as the draw-strings 7 and 22. An outer disk 26, formed of a base of cardboard covered with fabric, may be attached by stitching or adhesive material to the back of the fabric 25. The hinge 13$^a$ may be introduced between the fabric 25 and the outer disk. A handle, for opening the cover, is not required, although the same may be used if necessary. The hinge 13$^a$ is secured to the fabric 25 by stitching, so that it will be firmly attached thereto. A catch 15$^a$ is used to secure the cover in place. The absence of metal parts in the structure avoids the danger of the parts rusting or oxidizing, and produces a device which may be readily manufactured by ordinary appliances used for sewing. The attachment of the mirror to the bottom of the bag by means of the ring produces a structure which very strongly holds the mirror in position, and in which it is impossible for the mirror to become loose and avoids the use of any metal or other fastenings.

It is to be noted that in the first embodiment of my invention, when the cover 3 is in the closed position it will lie partly within the ring 4. This will center the cover and will prevent its dislodgment, and will also produce a more rigid structure than if the cover lay outside of the ring. In the second embodiment of my invention described, the ring will lie, when the cover is closed, outside of the outer disk 19, and in engagement with the fabric 20. This will aline the cover in position, and will assist it being properly held in addition to the hinge and catch.

In accordance with the provisions of the patent statutes, I have described the principle of my invention, together with the apparatus which I now consider to represent the best embodiment thereof, but I desire to have it understood that the apparatus shown is merely illustrative and that the invention can be carried out in other ways.

Having now described my invention, what I claim as new and desire to secure by Letters Patent is:

1. A hand-bag having a fabric portion, a mirror and a ring, the said ring being of less diameter than the mirror, and the said fabric being looped over the mirror and drawn against the back thereof.

2. A bag having a portion of fabric, a mirror and a ring of less diameter than the mirror, the said fabric being looped around the ring and drawn against the mirror by a drawstring.

3. A bag formed of fabric, having an unstretchable ring looped within the bag near its lower end, a mirror of greater diameter than the ring and within the same, and means for holding the fabric against the back of the mirror.

4. A fabric bag, having a mirror in its bottom, a ring surrounding the mirror, and a cover of less diameter than the ring, and lying within the ring.

5. A bag formed with walls of fabric, an unstretchable ring looped therein, a mirror of greater diameter than the internal diameter of the ring, stitches inclosing the ring in the fabric, a cover of smaller diameter than the ring, and lying within the ring, and fastening devices for the cover attached to the walls of the bag adjacent to the stitches and inside of the mirror.

This specification signed and witnessed this 29th day of April, 1908.

CONSTANCE T. SLADE.

Witnesses:
G. M. PREISSINGER,
E. GILCHRIST.